(12) United States Patent  
Shih

(10) Patent No.: US 9,807,351 B2  
(45) Date of Patent: Oct. 31, 2017

(54) CAR SIDE VIDEO ASSIST SYSTEM ACTIVATED BY LIGHT SIGNAL

(76) Inventor: I-Chieh Shih, Kaohsiung (TW)

( * ) Notice: Subject to any disclaimer, the term of this patent is extended or adjusted under 35 U.S.C. 154(b) by 367 days.

(21) Appl. No.: 13/823,637

(22) PCT Filed: Sep. 8, 2011

(86) PCT No.: PCT/CN2011/001522  
§ 371 (c)(1),  
(2), (4) Date: Mar. 14, 2013

(87) PCT Pub. No.: WO2012/034356  
PCT Pub. Date: Mar. 22, 2012

(65) Prior Publication Data  
US 2013/0182113 A1    Jul. 18, 2013

(30) Foreign Application Priority Data  
Sep. 14, 2010   (CN) .......................... 2010 1 0280427

(51) Int. Cl.  
*H04N 7/18*    (2006.01)  
*B60Q 1/00*    (2006.01)  
*B60R 1/00*    (2006.01)  
*G06D 7/00*    (2006.01)

(52) U.S. Cl.  
CPC .............. *H04N 7/183* (2013.01); *B60R 1/00* (2013.01); *H04N 7/181* (2013.01); *B60R 2300/70* (2013.01)

(58) Field of Classification Search  
None  
See application file for complete search history.

(56) References Cited

U.S. PATENT DOCUMENTS

| 5,530,421 | A | * | 6/1996 | Marshall | B60R 1/00 340/435 |
|---|---|---|---|---|---|
| 5,680,123 | A | * | 10/1997 | Lee | 340/937 |
| 5,793,420 | A | * | 8/1998 | Schmidt | 348/148 |

(Continued)

FOREIGN PATENT DOCUMENTS

| CN | 2192506 Y | 3/1995 |
|---|---|---|
| CN | 1988655 A | 6/2007 |

(Continued)

*Primary Examiner* — Jorge L Ortiz Criado  
*Assistant Examiner* — Susan E Hodges  
(74) *Attorney, Agent, or Firm* — Rosenberg, Klein & Lee

(57) ABSTRACT

A car side video assist system activated by light signals is revealed. The system includes at least two cameras respectively disposed on the left, right or rear side of a car for capturing images at corresponding sides and forming image signal sources. By using different light signals including left/right turn, warning or reversing signals as the activation signal sources, at least one camera is selected and activated and the images capture form at least one image/picture on a screen. The video signal source switch processor further includes a light signal interpretation processor that starts interpretation after a preset critical time such as 8 milliseconds when a light signal is activated and input. The interpretation continues for a preset period of time such as 300 milliseconds to output the result for preventing misinterpretation and interpreting the light signal is a single left/right turn signal or a warning signal accurately.

15 Claims, 7 Drawing Sheets

(56) References Cited

U.S. PATENT DOCUMENTS

| | | | | |
|---|---|---|---|---|
| 6,876,300 | B2* | 4/2005 | Ponziani | B60Q 1/40 |
| | | | | 162/36 |
| 7,280,037 | B2* | 10/2007 | Arai | B60K 37/02 |
| | | | | 340/438 |
| 7,355,628 | B2* | 4/2008 | Matko et al. | 348/148 |
| 7,463,281 | B2* | 12/2008 | Luskin | B60R 1/00 |
| | | | | 348/148 |
| 2007/0088488 | A1* | 4/2007 | Reeves et al. | 701/117 |
| 2010/0134325 | A1* | 6/2010 | Gomi et al. | 340/995.14 |

FOREIGN PATENT DOCUMENTS

| | | |
|---|---|---|
| CN | 201751235 U | 2/2011 |
| CN | 10213664 A | 8/2011 |
| CN | 201376542 Y | 8/2011 |
| CN | 201951364 U | 8/2011 |

* cited by examiner

CAR SIDE VIDEO ASSIST SYSTEM ACTIVATED BY LIGHT SIGNAL

BACKGROUND OF THE INVENTION

The present invention relates to a car side video assisted system, especially to a car side video assisted system that uses light signals as activation signal sources to select and activate one of at least two car side cameras. Moreover, a light signal interpretation processor is arranged at a video signal source switch processor. Thus signal interpretation is started after a preset critical time, continued for a period of time, and then interpretation result is output.

Car side video assisted systems have gradually become essential safety equipment of vehicles. Generally, a plurality of cameras is arranged at different positions of a car. When drivers are reversing cars, turning left or turning right, one of the cameras is activated synchronously and correspondingly. For example, the rear side camera is activated while the car is reversing. The left side camera or the right side camera is activated when the driver is turning left or turning right so as to capture images at corresponding car side and output the car side images captured by the corresponding camera to a screen of a display device. At least one picture is shown on the screen. Take a Taiwanese car model such as Luxgen as an example. The car side video assisted system show images at the front side, the rear side, the left side, and the right side of the car while reversing the car. While turning left or right, images at the left side or the right side of the car are displayed on the screen. Thus the driving safety during reversing, parking, turning left and turning right is improved.

Techniques related to car side video assist systems usually uses vehicle signals such as range signals or indicator light signals as activation signal sources. That means the reverse gear shift or switching of the indicator lights such as to the left turn switch or the right turn switch is considered as an activation mode of light signals. Thus corresponding cameras at car sides are respectively activated by the activation signal sources to have pictures shown on the screen and seen by the driver. However, the car side video assist systems with such activation mode need to be connected to gear shifts or switches of indicator lights while being installed. Thus the systems are built in cars when the cars are out of the factory. It's difficult to install the video assist systems after the car becoming out of the factory. The installation of the video assist systems is in special car service and repair plants. This is not good for promotion and prevalence of the car side video assist systems. Moreover, the installation cost is also increased due to difficulties in installation. The integrity of internal equipment or car body may be also damaged.

If light signals such as reverse signals, left turn signals or right turn signals are used as activation signal sources to activate corresponding cameras at car sides respectively to replace the vehicle signals used before. Yet the car side video assist system with such activation mode still has following problems while in use.

First the light signals of cars generally include reverse signals, left/right turn signals and warning signals. The warning signal is formed by the left turn signal and the right turn signal activated at the same time (synchronous light signals). But circuit of the left light signal and circuit of the right turn signal are two separated circuit. Thus strictly speaking, the left turn signal and the right turn signal are not activated synchronously. There is a time difference between the left turn signal and the right turn signal when the driver switched to the warning signal. The time difference varies according to different design of car models or car bodies, generally ranging from 0.15 second to 0.25 second or shorter. In consideration of the time difference, one of the left and the right turn signals such as the left turn signal is activated first (the time difference is no longer than 0.15-0.25 second) when the driver switches the light signal to the warning signal. At this moment, the video signal source switch processor uses the left turn signal as the activation signal source so as to activate the left side camera correspondingly for capturing images on the left side of the car and showing the left side images on the screen. Then the right turn signal is also on. Now the video signal source switch processor takes the right turn signal as the activation signal source so that the right side camera is activated correspondingly and the right side images are captured and displayed on the screen. This causes quick switch between the image taken from the car left side and the image captured from the car right side on the screen and the driver is unable to see the images clearly. Or the left turn signal is activated first while the right turn signal is activated later (the time difference is no longer than 0.15-0.25 second). Then the video signal source switch processor uses the left turn signal as the activation signal source so as to activate the left side camera correspondingly for capturing images on the left side of the car, outputting and displaying the left side images on the screen. When the right turn signal is activated, the video signal source switch processor still takes the left turn signal as the activation signal source to activate the left side camera correspondingly for capturing, outputting and showing the left side images on the screen. The left side images continue staying on the screen. That means the video signal source switch processor can't accurately use the warning signal as the activation signal source to activate the corresponding cameras preset. For example, it is originally set to activate multiple cameras when the warning signal is activated. The multiple cameras including at least three cameras—the left side camera, the right side camera and the rear side camera for capturing images at three sides of the car and outputting the images to form three sub-pictures on the screen. The images on the left side, the right side and the rear side of the car are displayed on the screen at the same time. Thus the video signal source switch processor is unable to provide the preset functions and the activation accuracy is affected. Therefore the efficiency of the car side video assist system is reduced.

Moreover, no matter the light signals of cars including reverse signals, left/right turn signals and warning signals are activated or enabled, noises occur at the circuit. For example, the noises are generated when the car battery power and other electrical equipment are used at the same time. The duration of the noise is usually shorter than that of the light signals, just a few milliseconds such as 8 milliseconds (0.008 s). But misinterpretation is still easy to occur in the car side video assist system when the noises and the light signals are mixed with each other. Thus the activation accuracy is affected.

Furthermore, the car side video assist system available now, including the car side video assist system using vehicle signals as activation signal sources, basically doesn't take the priority of the light signals into consideration. The so-called priority means which car side camera is activated and images at the corresponding side of the car are first displayed on the screen of the display device are determined according to the importance of the activation light signals. Thus the images are divided into substitutive images and non-substitutive images. The driver usually turns on light signals according to his driving habits. The action/event of each light signal activated independently has certain meaning and respective importance. Thus the action/event can be substitutive and non-substitutive. For example, the importance of the action of the warning light is larger than that of the turning light while the car is broken down or the driver is parking on roadside. Thus the action of the turning light can be immediately replaced by the action of the warning light. That means the images displayed correspondingly to the action of the turning light are substituted by the images displayed correspondingly to the action of the warning light while the images displayed correspondingly to the action of the warning light are non-substituted by the images displayed correspondingly to the action of the turning light. The importance of the action of the turning light is larger than that of the reversing. Thus the action of the reversing light can be immediately replaced by the action of the warning light. That means the images displayed correspondingly to the action of the reversing light are substituted by the images displayed correspondingly to the action of the turning light while the images displayed correspondingly to the action of the turning light are non-substituted by the images displayed correspondingly to the action of the reversing light. The left turn light and the right turn, light are of the same importance. Thus images displayed correspondingly to the action of a previous turning light are replaced by images displayed correspondingly to a new turning light. If the car side images on the screen of the car side video assist system can be displayed according to the preset priority logic mentioned above, this not only matches driver's driving habits but also improves the efficiency of the car side video assist system. However, the car side video assist system available now doesn't take the above priority into consideration. While in use, images at the rear side, left side or right side of the car are displayed on the screen during car reversing, left turn or right turn. Once there is an accidental event, the images are unable to be switched immediately for satisfying the driver's needs. For example, the driver needs to turn on the warning light when the left/right turn light is on under certain conditions (such as the driver finds the parking space after turning the car and intends to get the space). Yet the image on the screen is unable to be switched from the left/right side image to the image corresponding to the action of the warning light with higher priority along with the warning light. That means the action of the warning light can't replace the action of the turning light. Under another condition, the driver needs to see the left side image while reversing the car (without affecting other cars) but the image is unable to be switched from the reversing image to the image corresponding to the left turn light immediately along with the left turn light. That means the action of the turning light can't replace the action of the reversing light.

In addition, the screen of the car side video assist system available now only shows the action of the driver at the moment such as reversing the car, activation of the left turn signal or the right turn signal. Once the driver stop the above action, the image on the screen disappears synchronously. The video assist system is unable to automatically switch to show useful pictures on the screen for driver's reference according to the driver's driving habits. Take the condition of parking the car or driving the car out of roadside parking space as an example. The roadside parking or driving the car out is unable to be done at once. That means the driver can't drive the car into or out of the narrow parking space just by one-time car reversing. The driver needs to reverse the car and then drive the car forward several times. Yet the car side video assist system used now only shows images on the rear side of the car while the driver reversing the car. Once the driver puts the car into other gear, the image on the screen disappears and there is no other useful images shown on the screen for the driver's reference during the parking process. For example, when the car is driving forward, the driver doesn't know whether there is an object (such as mudguard of a front car) in front of or under the car. Some careful drivers may turn on the warning signal during the parking process for increasing the driving safety. The car side video assist system available now has not take such condition into consideration so that the system doesn't work under the condition.

Thus there is a need to develop a car side video assist system that is easy to be installed on various car bodies for improving both the consumer acceptance and the market acceptance. Moreover, the efficiency of the car side video assist system is improved and misinterpretation caused by noises can be avoided for increasing the interpretation accuracy.

SUMMARY OF THE INVENTION

Therefore it is a primary object of the present invention to provide a car side video assist system activated by light signals that includes at least two cameras respectively arranged at different positions of the car such as the left side, the right side or the rear side for capturing corresponding car side images and forming image signal sources output to an video signal source switch processor. The video signal source switch processor automatically switches and activates at least one camera according to different light signals and output car side images corresponding to the camera to form at least one image/picture on a screen of a display device. The video signal source switch processor further includes a light signal interpretation processor. When a light signal is activated and input into the video signal source switch processor, the light signal interpretation processor starts interpretation after a preset period of time (critical time) such as 8 milliseconds, continues for a preset period of time such as 300 milliseconds, and then outputs interpretation results so as to automatically select and activate the corresponding camera. Thereby not only misinterpretation caused by other noises can be avoided, whether the light signal is a single left turn/right turn signal or a warning signal can also be interpreted more accurately. The system is easy to be installed on and applied to different vehicle bodies and the signal interpretation accuracy is increased.

It is another object of the present invention to provide a car side video assist system activated by light signals that further includes a rear side camera arranged at a rear side of the car or a front side camera so as to increase more options of car side images shown on the screen.

It is a further object of the present invention to provide a car side video assist system activated by light signals in which the video signal source switch processor further includes a signal output priority controller. The signal output priority controller is for setting a priority logic according to the importance of the action of activation signals (light signals). Thus which camera is activated and the corresponding images to be displayed on the screen first are determined according to the priority logic. The images shown on the screen includes substitutive images and non-substitutive images due to respective priority. The importance of the activation signals (light signals), the priority of the light signals, can be set according to driver's habits for activating light signals. Thereby the car side images/pictures with higher priority according to the priority logic are displayed first on the screen to meet driver's needs.

It is a further object of the present invention to provide a car side video assist system activated by light signals in which the signal output priority controller is not only used for setting the priority logic according to driver's habits for activating light signals but also used for setting a temporary priority logic according to general driver's driving habits during a time gap between two light signals. The time gap is time difference between a previous light signal and a next light signal. Thus the system is automatically switched to select and activate at least one camera for displaying at least one useful image to be seen by the driver when the previous light signal is released but the next light signal is not generated. Therefore the weakness of the driver can be overcome.

It is a further object of the present invention to provide a car side video assist system activated by light signals in which the front side camera is also set in the temporary priority logic preset by the signal output priority controller. That means there is one more option in the temporary priority logic. When the previous light signal is released but the next light signal is not generated, the system is automatically switched to select and activate the front side camera according to the temporary priority logic. Thus the image in front of the car is immediately displayed on the screen to be viewed by the driver. Thus the driver can see whether there is an object on the front side of the car (blind spot of the driver) when the reverse signal is released and the car is changed to a forward gear so as to improve the driving safety and convenience.

It is a further object of the present invention to provide a car side video assist system activated by light signals in which the signal output priority controller determines which camera and corresponding car side images are with higher priority to be activated and displayed on the screen according to the priority logic and the temporary priority logic. Thus the system helps drivers to overcome their weakness in driving.

It is a further object of the present invention to provide a car side video assist system activated by light signals that is used together with an event data recorder (EDR). The EDR is connected to the car side video assist system by a port so as to capture and record image data by at least one camera or an extended front side camera of the car side video assist system. Moreover, the image data recorded by the EDR is displayed by the display device of the system so that the system provides functions of the EDR.

It is a further object of the present invention to provide a car side video assist system activated by light signals that is used in combination with a global positioning system (GPS) and is connected to the GPS by a port. Thus vehicle data provided by the GPS is displayed by the display device of the car side video assist system and the system provides functions of the GPS.

DETAILED DESCRIPTION OF THE PREFERRED EMBODIMENT

Figure 1:
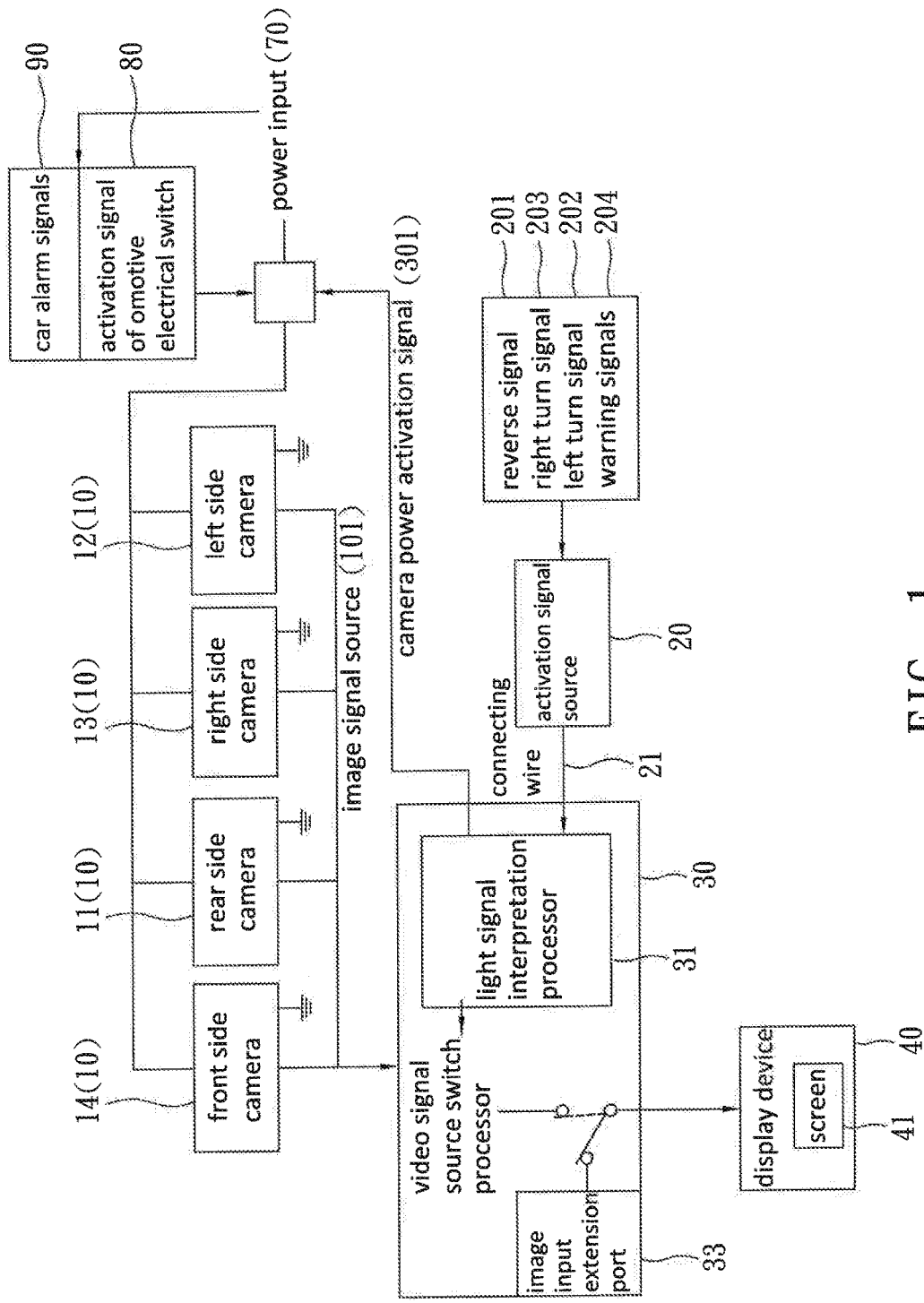
FIG. 1 is a block diagram showing a car side video assist system activated by light signals according to the present invention.

Refer to FIG. 1, a car side video assist system activated by light signals 1 of the present invention includes at least two car side cameras 10, an activation signal source 20, a video signal source switch processor 30 and a display device 40.

Figure 5:
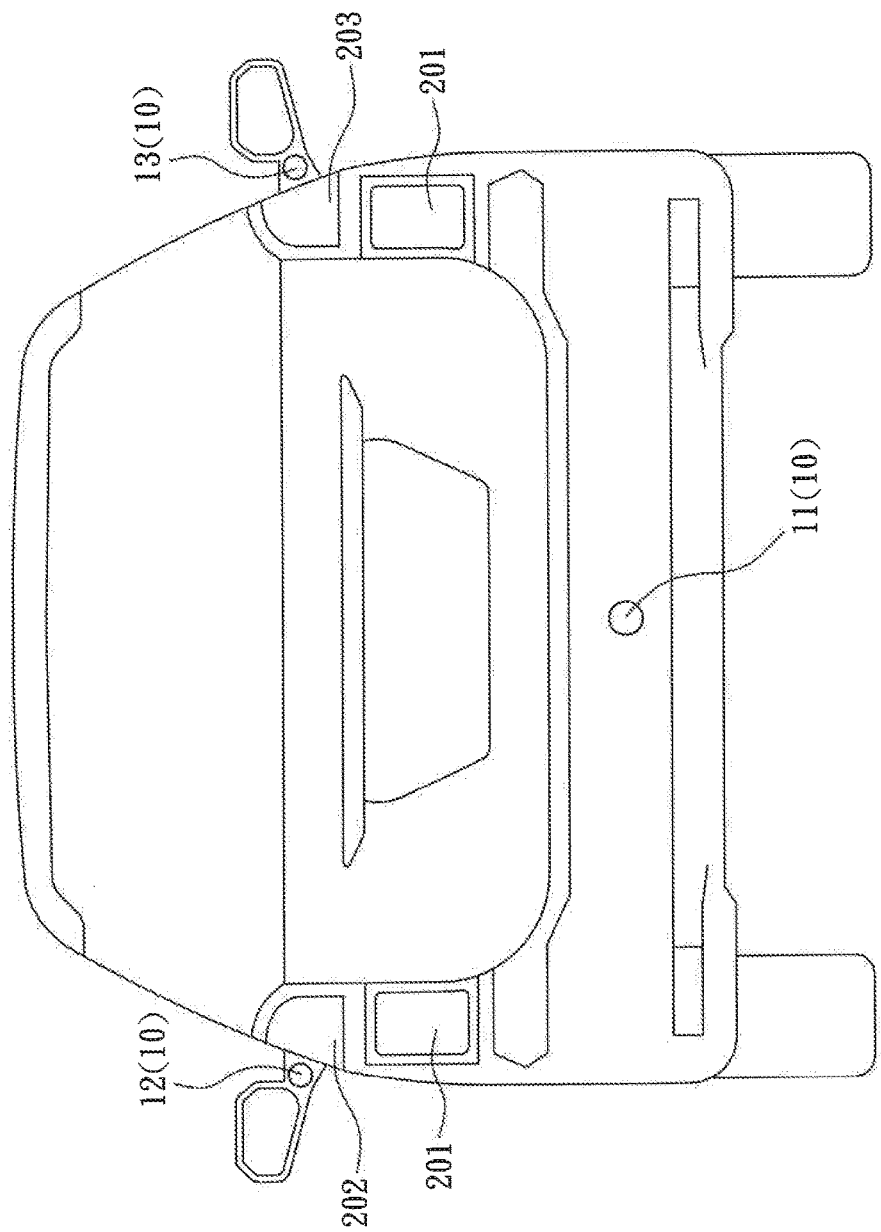
FIG. 5 is a schematic drawing showing three cameras respectively arranged at a rear side, a left side and a right side of a car according to the present invention.

The car side cameras 10 consists of at least one left side camera 12 and at least one right side camera 13 respectively arranged at certain positions on the left side and the right side of a car, as shown in FIG. 5. In order to explain functions of the present invention conveniently, the cameras 10 further include a rear side camera 11 arranged at, but not limited to, a rear side of the car. The cameras 11, 12, 13 are used for capturing image on different sides of the car correspondingly to form image signal sources 101 that are output to the video signal source switch processor 30.

The activation signal source 20 is formed by reverse signals 201, left turn signals 202, right turn signals 203 and warning signals 204. The left turn signals 202 and the right turn signals 203 are synchronous signals. Once one of the above four signals is activated (the light is on, connected to a power), a light signal of the activation signal source 20 is formed. Then the activation signal source 20 outputs various light signals generated to the video signal source switch processor 30 by a connecting wire 21.

A camera power activation signal 301 is formed in the video signal source switch processor 30 according to different light signals such as the reverse signals 201, the left turn signals 202, the right turn signals 203 and the warning signals 204 from the activation signal source 20 so that the system is automatically switched to activate at least one corresponding car side camera 10 (11/12/13) of the three car side cameras 10 (11/12/13). For example, the reverse signal 201 can be designed to switch automatically to activate the ear side camera 11. The left turn signal 202 is designed to switch automatically to activate the left side camera 12. The right turn signal 203 is designed to switch automatically to activate the right side camera 13. The images on corresponding side of the car are captured by the cameras 11, 12, 13 respectively. Then the image signal source 101 formed by the corresponding camera 10 (11/12/13) passes through the video signal source switch processor 30 to be output to a screen 41 of the display device 40. Thus at least one image/picture is formed on the screen 41.

The car side video assist system activated by light signals 1 of the present invention can be installed easily on the car to be used and applied to different types of cars. Thus both the consumer acceptance and the market acceptance are improved. A power input 70 for activating the three cameras 10 (1.1/12/13) can activate all of the three cameras at the same time or one of the three cameras at a time. The all-at-one-time activation is to turn on the power of the three cameras 10 (11/12/13) and the cameras are in a power-on state and are further activated by the camera power activation signal 301 to capture images. As to the one-at-a-time activation, the power of only one camera is turned on by the camera power activation signal 301 and the camera starts to capture images. The power input 70 also provides power due to activation signal of automotive electrical switch 80. Or the power input 70 is used in combination with car alarm signals 90. The activation techniques of the power input 70 mentioned above are available now.

The video signal source switch processor 30 further includes a light signal interpretation processor 31. When a light signal is generated in the activation signal source 20 and is input into the video signal source switch processor 30, the light signal interpretation processor 31 starts interpretation after a critical time such as 8 millisecond (0.008 second), continues for a preset interpretation time such as 300 millisecond (0.3 second), and then outputs interpretation results so as to automatically select and activate the corresponding camera. For example, the critical time can be 8 millisecond (0.008 second) delay after input of the light signal. The light signal interpretation processor 31 mainly checks the light signal is formed by the reverse signal 201, the left turn signal 202, the right turn signal 203 or the warning signals 204 (The left turn signals 202 and the right turn signals 203 are synchronous signals). Thus the light signals are interpreted more accurately and misinterpretation can be avoided.

No matter the light signal of the car such as the reverse signal 201, the left or right turn signal 202, 203, and the warning signals 204 is turned on or off, there is still certain noise occurred in the circuit connected. Although the noise is generally generated within a certain period which is shorter than that of the light signal (usually not over 8 milliseconds), the noise still has effect on the interpretation of the light signal. Moreover, the warning signal 204 is formed by synchronous activation of the left and the right signals 202, 203 (activated at the same time). There is a time difference between the left and the right signals 202, 203, generally ranging from 0.15 second to 0.25 second, or even shorter. Thus the light signal interpretation processor 31 of the video signal source switch processor 30 is used to generate a special interpretation mechanism for accurate interpretation of the input light signal.

Refer to FIG. 1, the warning signal 204 is formed by synchronous signals—the left turn and the right turn signals 202, 203. However, the left turn and the right turn signals 202, 203 are not really activated at the same time. There is still a time difference between the left turn and the right turn signals 202, 203, generally ranging from 0.15 second to 0.25 second or even shorter. When the driver switches to the warning signal, one of the left turn and the right turn signals 202, 203 is activated first. For example, the left turn signal 202 is turned on first while the right turn signal 203 is turned on later (with the time difference ranging from 0.15 second to 0.25 second or even shorter). At this moment, the video signal source switch processor 30 takes the left turn signal 202 as the light signal of the activation signal source 20 (the camera power activation signal 301). Thus the left side camera 12 is activated correspondingly and the misinterpretation occurs. Then the right turn signal 203 is also on. Now the video signal source switch processor 30 takes the right turn signal 203 as the light signal of the activation signal source 20 so that the right side camera 13 is activated correspondingly. Thus the misinterpretation happens again and this lead to quick switch between the image taken from the car left side and the image captured from the car right side on the screen 41. Moreover, if the left turn signal 202 is turned on first while the right turn signal 203 is turned on later (with the time difference ranging from 0.15 second to 0.25 second or even shorter), the video signal source switch processor 30 takes the left turn signal 202 as the light signal of the activation signal source 20 and activates the left side camera 12 correspondingly. Thus images captured from the car left side are output and displayed on the screen to form car left side images. Then the right turn signal 203 is also turned on. But the video signal source switch processor 30 still takes the left turn signal 202 as the light signal of the activation signal source 20 so that the left side camera 12 is activated for capturing and outputting car left side images to be displayed on the screen 41. Thus the left side images stay on the screen 41 although the right turn signal is activated. If the warning signals 204 is set to activate multiple cameras 10 including the rear side camera 11, the left side camera 12 and the right side camera 13 for capturing car side images at three directions. The car side images are output to form three sub-images displayed on the screen 41. Thus the light signal interpretation processor 31 can use the camera power activation signal 301 as the warning signal 204 and the misinterpretation will not happen. The light signal interpretation processor 31 improves the accuracy of the interpretation of the activation signal source 20 (camera power activation signal 301).

Figure 7:
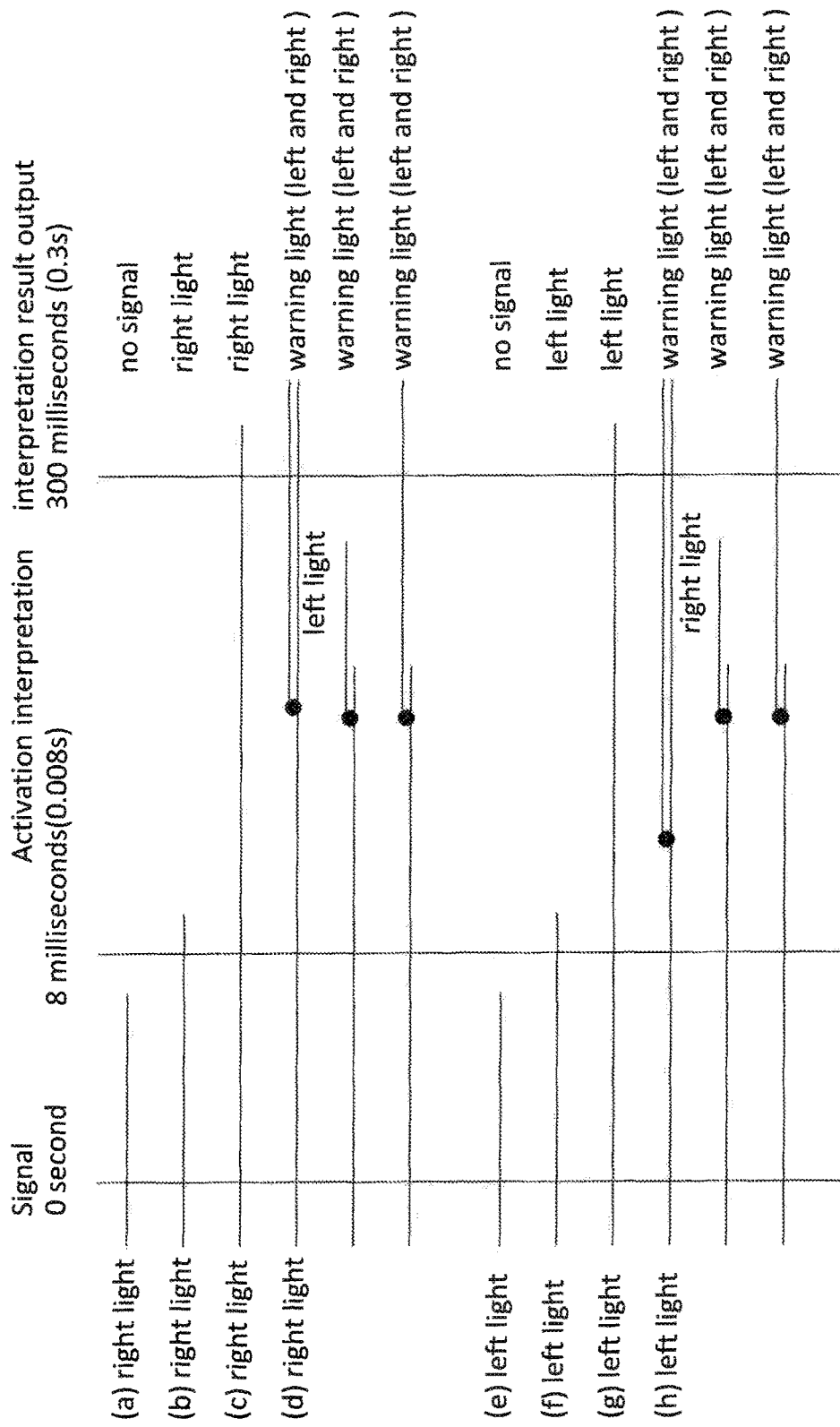
FIG. 7 is a schematic drawing interpretation conditions of a light signal interpretation processor according to the present invention.

Refer to FIG. 7, an interpretation mechanism of the light signal interpretation processor 31 is explained by various conditions ranging from (a) to (h). When a signal including a light signal generated by the activation signal source 20 or other noise signal is input into the light signal interpretation processor 31, various conditions ranging from (a) to (h) may occur.

condition (a): when there is a signal generated from the right turn signal and the signal disappears within a critical time such as 8 millisecond (0.008 ms), the signal is interpreted as "not right turn signal" and the interpretation result output is "no signal". This means the signal is like general noise.

condition (b), (c): when there is a signal generated from the right turn signal and the signal lasts over a critical time such as 8 millisecond (0.008 ms) and there is no other signal occurred within a preset interpretation time such as 300 millisecond (0.3 s), the signal is interpreted as "right turn signal" and the interpretation result output is "right turn signal" no matter the signal lasts over the interpretation time. For example, the single doesn't last over 300 ms (0.3 s) in the condition (b) while the signal lasts over 300 ms (0.3 s) in the condition (c). The length of the signal, short in the condition (b) and long in the condition (c), varies according to different models of vehicles or vehicles in different years (new/old vehicles or circuit aging).

condition (d): when there is a signal generated from the right turn signal, the signal continues over a critical time such as 8 millisecond (0.008 ms) and a preset interpretation time 300 millisecond (0.3 s) and there is a left turn signal generated within the preset interpretation time (0.3 s), the signal is interpreted as "warning signal" and the interpretation result output is "warning signal" no matter how long the left turn signal lasts.

condition (e): when there is a signal generated from the left turn signal and the signal disappears within a critical time such as 8 millisecond (0.008 ms), the signal is interpreted as "not left turn signal" and the interpretation result output is "no signal". This means the signal is like general noise.

condition (f), (g): when there is a signal generated from the left turn signal and the signal lasts over a critical time such as 8 millisecond (0.008 ms) and there is no other signal occurred within a preset interpretation time such as 300 millisecond (0.3 s), the signal is interpreted as "left turn signal" and the interpretation result output is "left turn signal" no matter the signal lasts over the interpretation time. For example, the single doesn't last over 300 ms (0.3 s) in the condition (f) while the signal lasts over 300 ins (0.3 s) in the condition (g). The length of the signal is short in the condition (0 and long in the condition (g) and it may vary according to different models of vehicles or vehicles in different years (new/old vehicles or circuit aging).

condition (h): when there is a signal generated from the left turn signal, the signal continues over a critical time such as 8 millisecond (0.008 ms) and a preset interpretation 300 millisecond (0.3 s) and there is a right turn signal generated within the preset interpretation time (0.3 s), the signal is interpreted as "warning signal" and the interpretation result output is "warning signal" no matter how long the left turn signal lasts.

Thus the left turn signal 202, the right turn signal 203 or the warning signal 204 is interpreted accurately through the interpretation mechanism of the light signal interpretation processor 31 and the misinterpretation will not occur. As to the circuit design of the light signal interpretation processor 31 or a single image/multiple sub-images shown on the screen 41 of the display device 40, it can be achieved by electrical techniques available now.

Moreover, the lighting pattern of the left turn signal 202 and the right turn signal 203 is revolving flashing at intervals. There is a time gap between each "light on" and "light off" and the time gap generally is within 2 seconds. In the conditions (b), (c), (d) or (f), (g), (h) in FIG. 7, the car-side image shown on the screen 41 is set to be displayed for a period of continuous display time which should be longer than the time gap when the light signal interpretation processor 31 outputs a light signal selected from the group consists of the left turn signal, the right turn signal and the warning signal, and the video signal source switch processor 30 activates at least one car-side camera for capturing car-side images to be displayed on the screen 41. For example, the car-side image is set be displayed for at least 2 seconds so that the car-side image is shown on the screen 41 stably. The car-side image on the screen will not flicker along with the on/off of the light signal 202/203. That means the car-side image continues to be shown on the screen 41 for at least 2 seconds once the light signal 202/203 being interpreted and activated. Within the 2 seconds, the light signal (the left turn signal 202 or the right turn signal 203) is on/off once again and another interpretation is performed. Thus the car-side images are displayed on the screen 41 continuously and stably unless the driver switches the light signal within the time gap (2 seconds) and the light signal interpretation processor 31 interprets that another effective light signal is generated. Then the car-side image shown on the screen 41 is switched to another car-side image captured by a car-side camera activated by the effective light signal generated correspondingly.

Figure 2:
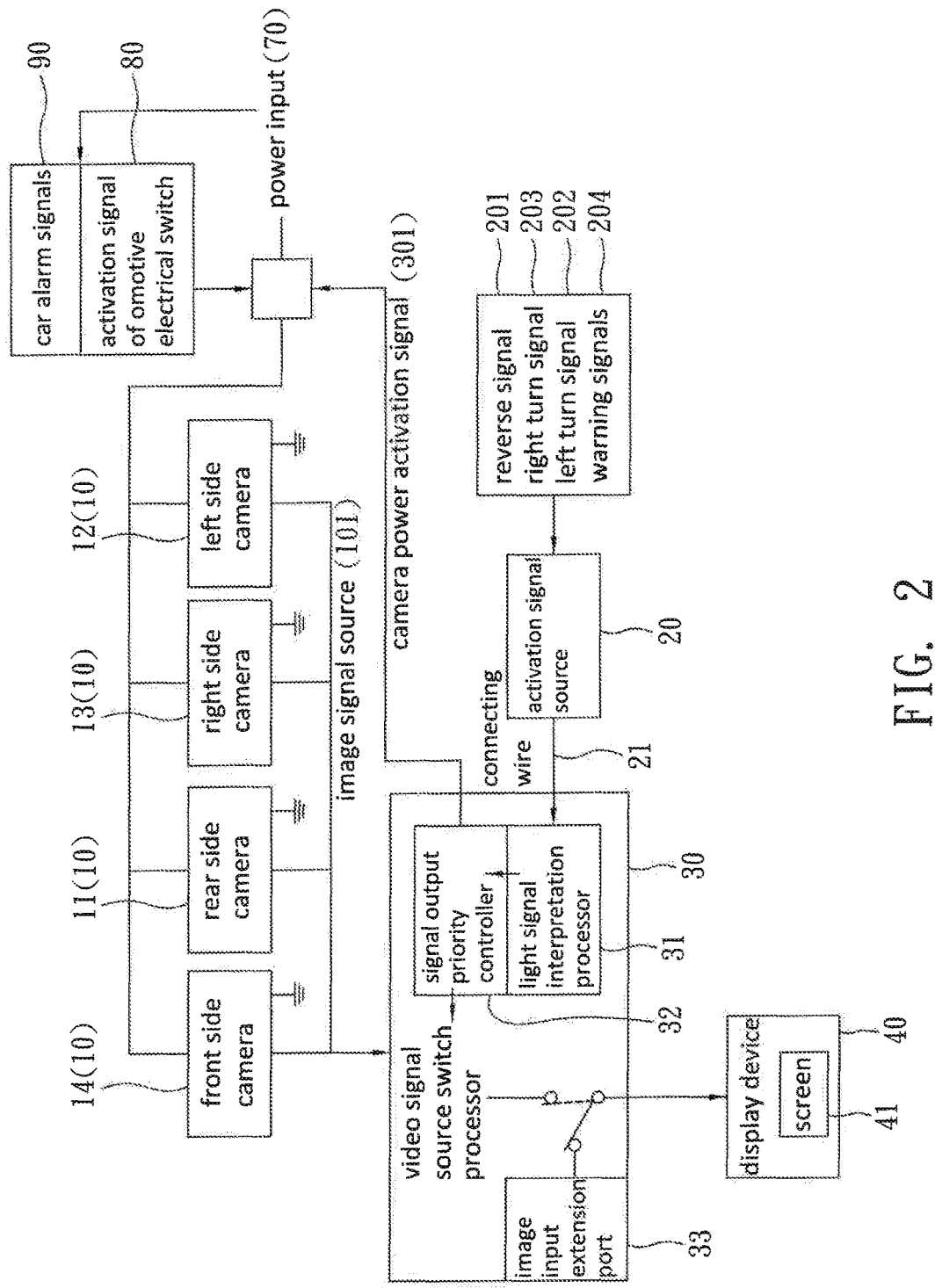
FIG. 2 is a block diagram showing the embodiment in FIG. 1 further including a signal output priority controller according to the present invention.

Refer to FIG. 2, the video signal source switch processor 30 further includes a signal output priority controller 32. The signal output priority controller 32 is used to set a priority logic according to the importance of the light signal (camera power activation signal 301) generated from the reverse signal 201, the left turn signal 202, the right turn signal 203, or the warning signals 204. Thus the priority of images captured by the car-side camera 10 (11/12/13) to be displayed on the screen 41 is determined according to the priority logic. The images shown on the screen 41 are divided into substitutive/non-substitutive due to the priority logic. The importance/priority of the light signal can be set according to driver's habits for activating light signals. In an embodiment of the priority logic according to the present invention, the priority logic can be set as that: the importance/priority of the action of warning lights (the warning signal 204) is higher than that of the action of turning lights (the left turn signal 202, the right turn signal 203). Thus the images displayed correspondingly to the turn signals are immediately substituted by the images corresponding to the warning signal 204. On the other hand, the images corresponding to the warning signal 204 are non-substituted by the images corresponding to the turn signals 202, 203. Moreover, the images displayed correspondingly to the reversing light are substituted by the images corresponding to turn signals if the importance/priority of the action of turn lights (the left turn signal 202, the right turn signal 203) is set prior to that of the reverse mode (reverse signal 201). On the other hand, the images corresponding to turn signals 202/203 are non-substituted by the images corresponding to the reversing signal 201. Once the left turn light and the right turn light are set with the same importance/priority, the images corresponding to the left turn signal 202 and the right turn signal 203 can replace each other. Thus the car side images shown on the screen 41 are the images with higher priority according to the priority logic mentioned above. Therefore this matches driver's habits and the efficiency of the car side video assist system is improved. However, the priority set above is only an embodiment and there is no limit on priorities set in the priority logic. The priorities in the priority logic are set according to individual's operation habits for activating light signals or personal requirements.

Besides the above priority logic, the signal output priority controller 32 can further preset a temporary priority logic during a time gap between the front and the rear light signals. When a previous light signal already disappears yet the next light signal is not generated, there is a time gap. The temporary priority logic is used for automatically switching and activation of at least one camera 10 (11/12/13) according to driver's needs so that at least one useful image is first displayed on the screen 41 to be watched by the driver. For example, the driver may stop the car or drive the car out of roadside parking space while the previous light signal (the reverse signal 201) being released. At this moment, no matter the driver switches to the left/right turn signals, the system automatically switches to activate the left side camera 12 according to the temporary priority logic so that the driver can immediately see images regarding traffic conditions on the left side of the car while the reverse signal 201 (the previous light signal) being released.

Moreover, the system is automatically switched to the corresponding car side camera for capturing images after the previous light signal being released due to the temporary priority logic. The time required for the automatic switching and image retention can be set (5 or 10 seconds) in advance according to user's habits.

Furthermore, the lighting pattern of the left turn signal 202/the right turn signal 203 is flashing at regular intervals, on/off revolving flashing. There is a time gap between each cycle of on/off and the time gap generally is not over 2 seconds. Once the car side images have been determined according to the priority logic set by the priority controller 32 and the images with higher priority are shown on the screen 41, the car side images shown on the screen 41 can be set to be retained for a period of time that is over the above time gap. For example, the retention time is set to less than 2 seconds such as 5-10 seconds according to individual's requirements. Thus the car side images are displayed on the screen 41 stably, not flickering along with the on/off flashing lighting pattern of the left turn signal 202/the right turn signal 203. That means once the light signal the left turn signal 202/the right turn signal 203 has been interpreted to activate the system and display an image on the screen 41, the image is retained for a period of time such as 5-10 seconds (at least 2 seconds) unless another image with higher priority is generated within this period of time. Then the original image is replaced by the new image with higher priority.

The function of the signal output priority controller 32 is further explained. Basically, a light signal generated from the reverse signal 201, the left turn signal 202, the right turn signal 203 or the warning signal 204, the camera power activation signal 301, is set as the light signal with priority. That means once the signal output priority controller 32 receives the light signal selected from one of the followings: the reverse signal 201, the left turn signal 202, the right turn signal 203 and the warning signal 204, the car side image corresponding to the light signal is displayed on the screen 41 immediately no matter what kind of images are displaying on the screen 41 (such as TV program) at this moment. Moreover, the signal output priority controller 32 further determines priorities of various light signals of the activation signal source 20. That's the priority logic. For example, the priority of the warning signal 204 is higher than that of the left turn signal 202/the right turn signal 203 while the priority of the left turn signal 202/the right turn signal 203 is higher than that of the reverse signal 201. The left turn signal 202 and the right turn signal 203 have the same priority. Once the driver switches to the light signal with higher priority, the image corresponding to that light signal has replaced the image with lower priority shown on the screen 41 at the moment immediately. Thus the image on the screen 41 can match the driver's requirement. The car side images the driver needs most at the moment help the driver to drive more safely. Furthermore, the signal output priority controller 32 further sets a temporary priority order (temporary priority logic). The temporary priority logic works when the driver releases the previous light signal such as the reverse signal 201 but forgets to switch to another light signal such as the left turn signal 202 or others. At this moment, the system is automatically switched to activate the left side camera 12 according to the temporary priority logic. Thus the driver sees images at the left side of the car immediately after the reverse signal 201 (previous light signal) being released. Thus the efficiency of the car side video assist system is improved and this helps the driver to improve his weakness.

In addition, the system is automatically switched to activate the corresponding car side camera for capturing images according to the above temporary priority logic when the previous light signal is released. The automatic switch and retention time can be set in advance according to user's habits such as 5 seconds or 10 seconds.

Figure 6:
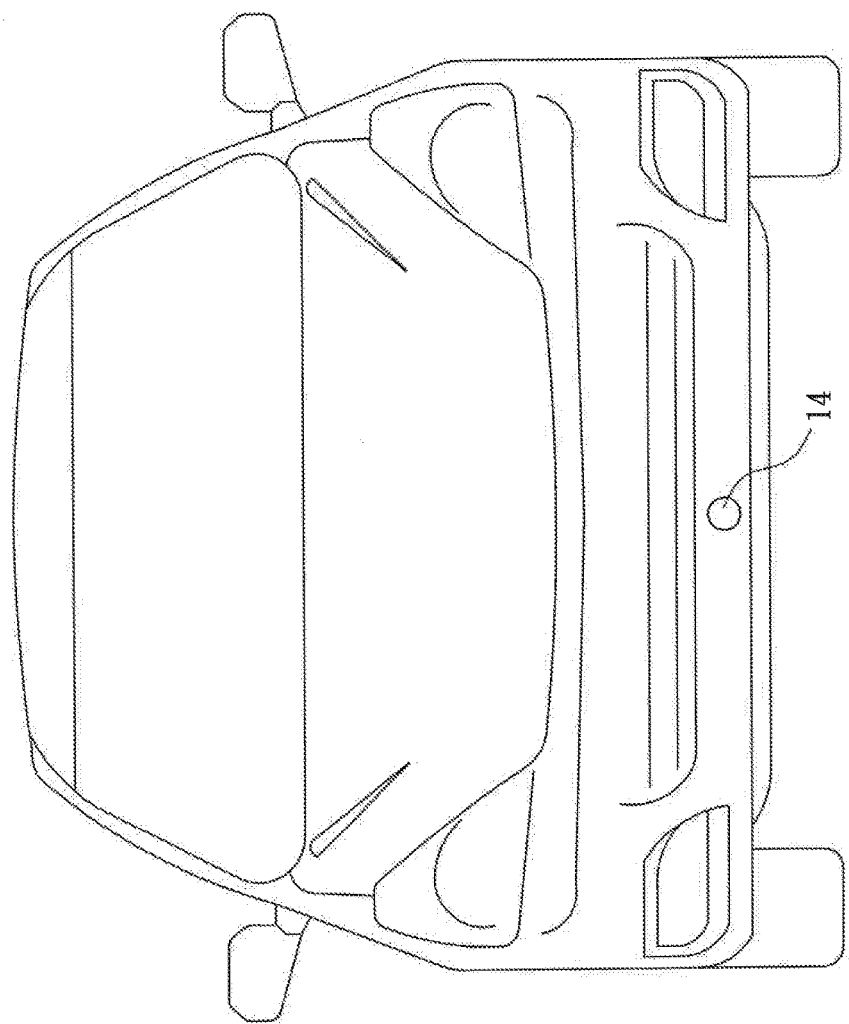
FIG. 6 is a schematic drawing showing a camera disposed on a front side of a car according to the present invention.

Refer to FIG. 1 and FIG. 6, the car side camera 10 further includes a front side camera 14 disposed on front of the vehicle. The front side camera 14 can be set in and controlled by the temporary priority logic that is preset by the signal output priority controller 32. That means there is one more option in the temporary priority logic. For example, when the previous reverse signal 201 is release but the later light signal is not generated (such as the driver doesn't switch to the left turn signal 202 for activating the left side camera 12), the system is automatically switched to activate the front side camera 14 according to the temporary priority logic. Thus the images viewed from the front side of the car are shown on the screen 41 right now and the driver can see whether there is an object on the front side of the car (blind spot of the driver) while the reverse signal 201 is released and the car is changed to a forward gear so as to improve the driving safety and convenience.

The system is automatically switched to activate the corresponding car side camera for capturing images according to the above temporary priority logic when the previous light signal is released. The automatic switch and retention time can be set in advance according to user's habits such as 5 seconds or 10 seconds.

The signal output priority controller 32 further determines which car side camera 10 (11/12/13/14) is activated and the corresponding images displayed on the screen 41 according to both the priority logic and the temporary priority logic. For example, when the car parked on roadside is going to move out and enter the lane, the driver reverses the car first and the changes the gear to move forward. After the reverse signal 201 (the previous light signal) being released yet the next light signal not being generated (the driver hasn't switched to the left turn signal 202), the system is automatically switched to activate the front side camera 14 according to the temporary priority logic so as to display images on the front side of the car (blind spot of the driver) and the driver can learn whether there is an object. Next the driver is going to turn left and enter the lane. By the priority logic together with the action of the left turn signal 202, the system is automatically switched to activate the left side camera 12 and the images on the left side of the car are shown on the screen 41 so as to help or improve the weakness of the driver.

The system is automatically switched to activate the corresponding car side camera for capturing images according to the above temporary priority logic when the previous light signal is released. The automatic switch and retention time can be set in advance according to user's habits such as 5 seconds or 10 seconds.

Figure 3:
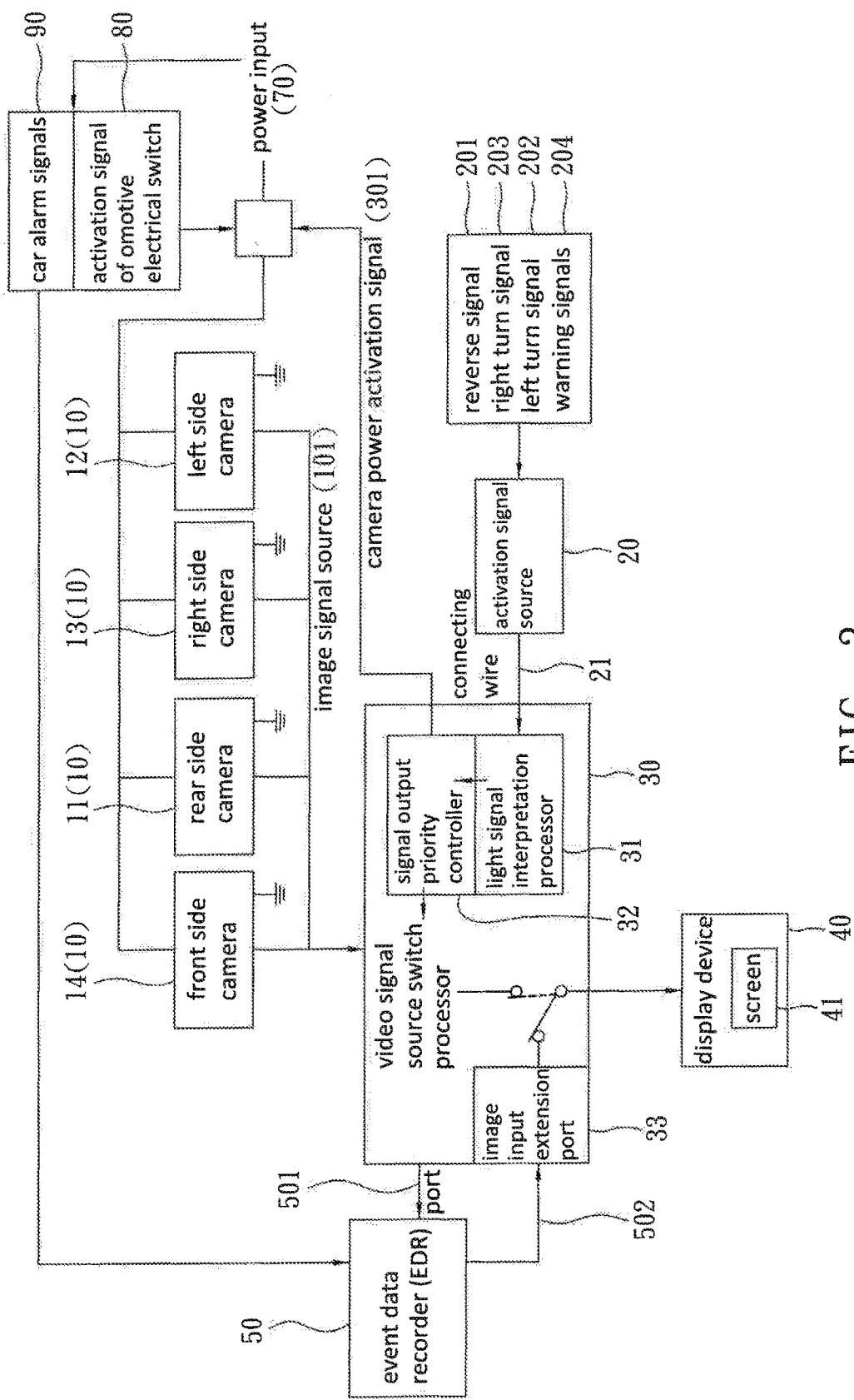
FIG. 3 is a block diagram of the embodiment in FIG. 2 used together with an event data recorder (EDR) according to the present invention.

Refer to FIG. 3, a car side video assist system activated by light signals 1 is further used in combination with an event data recorder (EDR) 50. The EDR 50 is connected to the video signal source switch processor 30 by a port 501. By at least one camera 10 (11/12/13) and/or the extended front side camera 14, the image data is captured and recorded. Moreover, the video signal source switch processor 30 is further extended to be added with an image input extension port 33, as shown from FIG. 1 to FIG. 4. The EDR 50 is further connected to the video signal source switch processor 30 by the image input extension port 33 and the image data recorded in the EDR 50 is displayed on the screen 41 of the display device 40. Thus the system provides functions of the EDR. The image data is recorded by 1 channel digital video recording, 4 (and above) channel digital video recording, or 4 channel in/1 channel out digital video recording. These techniques are available now.

Figure 4:
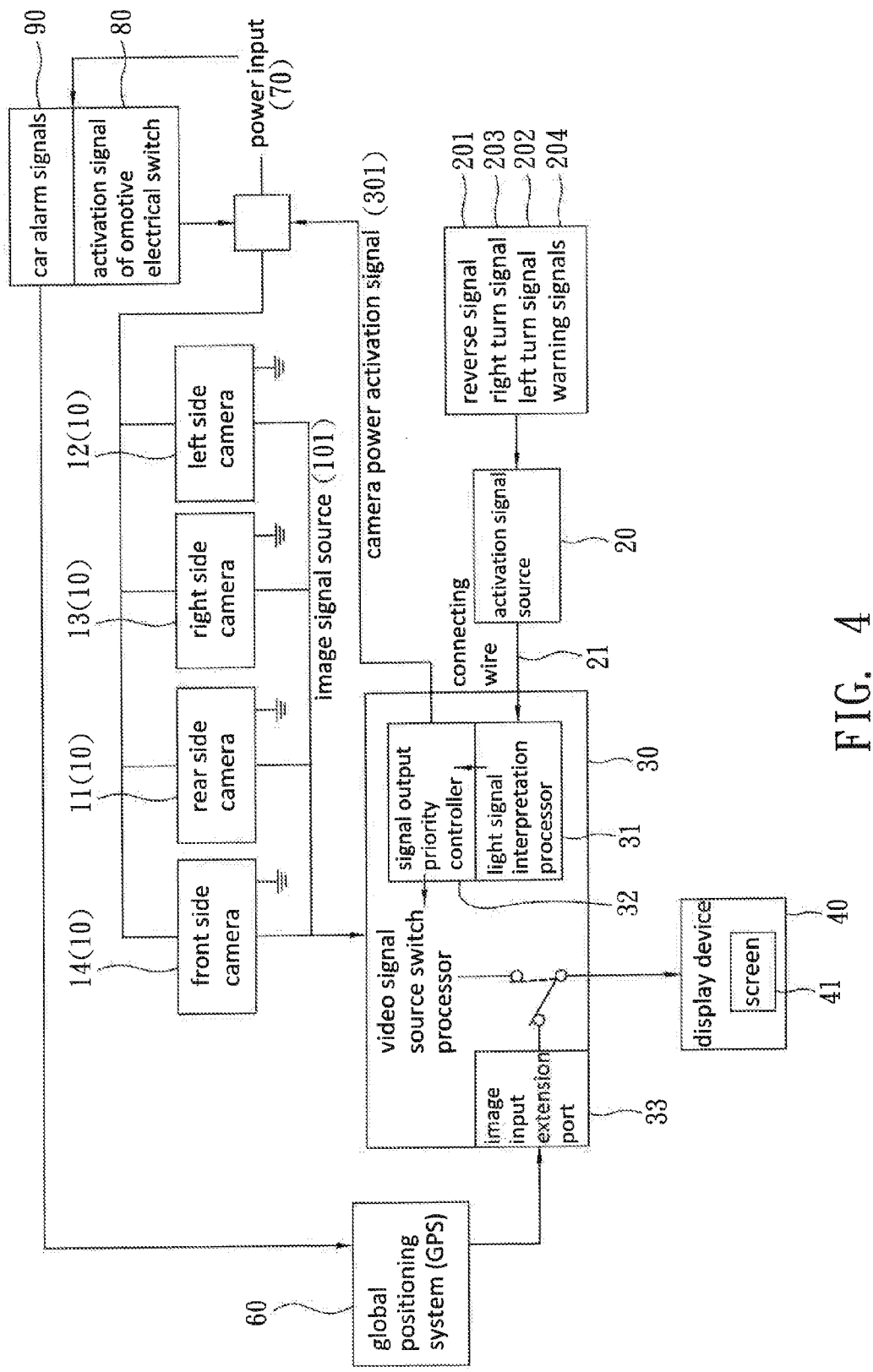
FIG. 4 is a block diagram of the embodiment in FIG. 2 used in combination with a global positioning system (GPS) according to the present invention.

Refer to FIG. 4, the present invention can be used together with a global positioning system (GPS) 60. The GPS 60 is connected to the image input extension port 33 of the video signal source switch processor 30 by a connection port 601 so as to show vehicle data of the GPS 60 on the screen 41 of the display device 40. Thus the system provides functions of the GPS. Or the present system is used in combination with not only the GPS, and an EDR. The vehicle data provided by the GPS as well as the image data captured by at least one camera 10 (11/12/13/14) and recorded by the EDR are displayed by the display device 40 and are used as records as well as evidence in future. The image data recorded by the EDR includes the vehicle data from the GPS such as date, time, global coordinate, speed (per hour). The image data is recorded by 1 channel digital video recording, 4 (and above) channel digital video recording, or 4 channel in/1 channel out digital video recording. These techniques are available now.

Compared with techniques available now, the car side video assist system activated by light signals 1 of the present invention has following features and advantages:

1. The present invention is easy to install on and is suitable for various types of vehicles. This increases both the consumer acceptance and the market acceptance.

2. The present invention improves the accuracy of light signal interpretation. The light signal is interpreted as a left/right turn signal or a warning signal accurately.

3. A priority logic is set in advance according to importance of activation light signal. The car side camera 10 (11/12/13) being activated and the corresponding images displayed on the screen 41 are determined by the priority logic. The images displayed on the screen 41 include substitutive images and non-substitutive images that matches driver's driving habits.

4. When the previous activation light signal disappears while the next activation light signal is not generated yet, the system is automatically switched to activate at least one camera 10(11/12/13) according to a temporary priority logic for displaying at least one useful image on the screen 41 to be seen by the driver. The temporary priority logic is preset according to driver's needs. Thus the efficiency of the car side video assist system is improved and the system helps the driver to overcome the weakness in driving habits.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A car side video assist system activated by light signals comprising:
at least two car side cameras, an activation signal source, a video signal source switch processor, and a display device;
wherein the car side cameras include at least one left side camera disposed on the left side of a car and at least one right side camera arranged at the right side of the car, for respectively capturing an image on the left side and an image on the right side of the car to form corresponding image signal sources that are output to the video signal source switch processor;
the activation signal source comprising a left turn signal, a right turn signal or a warning signal defined by a substantially contemporaneous activation of both of the left and the right turn signals, the activation signal source outputting a light signal corresponding to a selected one of the left turn signal, the right turn signal or the warning signal; the light signal being sent to the video signal source switch processor by a connecting wire;
the video signal source switch processor generating a camera power activation signal responsive to the light signal from the activation signal source to correspondingly select and activate the left side camera, the right side camera, or a combination thereof for capturing at least one image of the corresponding selected car side where the camera is located; the image captured at the corresponding car side is output to form at least one car side picture on the screen of the display device;
the video signal source switch processor further includes a light signal interpretation processor, the light signal interpretation processor is configured to interpret whether the activated light signal is one of the left turn signal, the right turn signal or the warning signal, wherein the light signal interpretation processor initiates interpretation of the light signal after a preset critical time period defining a first time interval, the light signal interpretation processor continues the interpretation for a preset interpretation time period defining a second time interval, and then outputs an interpretation result to select and activate at least one camera upon completion of the preset interpretation time period, the light signal interpretation processor being configured to: (1) interpret any light signal detected with a signal duration less than the preset critical time period as no signal, (2) interpret the activation of left or right signals corresponding to detection of the left or right signals, respectively, within the preset interpretation time period or second time interval, and (3) interpret the warning signal corresponding to detection of both the left and the right signals within the preset interpretation time period or second time interval.

2. The system as claimed in claim 1, wherein the car side cameras further include at least one rear side camera, the activation signal source further comprising the activation of reverse signals, the light signal interpretation processor being configured to ignore any light signal detected during the preset critical time period and to interpret the activation of the reverse signals corresponding to detection of the reverse signals within the preset interpretation time period, the video signal source switch processor generating a reverse power activation signal corresponding to interpretation by the light signal interpretation processor of the reverse signal within the preset interpretation time period to activate the rear side camera.

3. The system as claimed in claim 2, wherein the light signal interpretation processor starts interpretation after the critical time of 8 milliseconds, continues the interpretation for 300 milliseconds, and then outputs the interpretation result.

4. The system as claimed in claim 2, wherein the car side picture on the screen is set to be retained for a period of continuous display time when the light signal interpretation processor already output the interpretation result of the light signal selected from the group consisting of the left turn signal, the right turn signal and the warning signal, at least one car side camera is activated to capture car side images and the image captured at the corresponding car side is output to form at least one picture on the screen; the continuous display time is longer than a time gap between on-and-off of the light signal; within the continuous display time, the car side picture on the screen is switched to another car side image captured by the car side camera being activated by another effective light signal when the light signal is switched and interpreted by the light signal interpretation processor.

5. The system as claimed in claim 2, wherein the video signal source switch processor further includes a signal output priority controller, the signal output priority controller being configured to set a priority logic with respect to the light signals, the priority logic being programmed to correspond to a hierarchy of importance that are set according to a driver's habits for the reverse signal, the left turn signal, the right turn signal and the warning signal to allow for substitution of the image captured by the activated camera corresponding to the light signal with a lower priority with the image captured by the activated camera corresponding to the light signal with a higher priority so as to display the car side image corresponding to the light signal with higher priority on the screen.

6. The system as claimed in claim 5, wherein the car side picture on the screen is set to be retained for a period of continuous display time when the light signal interpretation processor already output the interpretation result of the light signal selected from the group consisting of the left turn signal, the right turn signal and the warning signal, at least one car side camera is activated to capture car side images and the image captured at the corresponding car side is output to form at least one picture on the screen; the picture of the image activated and captured corresponding to the light signal with lower priority is replaced by the picture of the image activated and captured corresponding to the light signal with higher priority when another light signal with higher priority is generated to activate at least one corresponding camera for capturing images within the continuous display time.

7. The system as claimed in claim 5, wherein the priority logic of the light signals is set as that: the priority of the warning signal is higher than the priority of the left and the right turn signals so that the images activated by and displayed correspondingly to the left and the right turn signals are immediately substituted by the images activated by and displayed correspondingly to the warning signal while the images activated by and displayed correspondingly to the warning signal are non-substituted by the images activated by and displayed correspondingly to the left and the right turn signals; the priority of the left and the right turn signals is higher than the priority of the reverse signal so that the images activated by and displayed correspondingly to the reverse signal are immediately substituted by the images activated by and displayed correspondingly to the left and the right turn signals while the images activated by and displayed correspondingly to the left and the right turn signals are non-substituted by the images activated by and displayed correspondingly to the reverse signal; the left turn signal and the right turn signal have equivalent priority so that the images activated by and displayed correspondingly to the left turn signal and the images activated by and displayed correspondingly to the right turn signal are able to replace each other.

8. The system as claimed in claim 5, wherein the signal output priority controller is further preset with a temporary priority logic with respect to the light signals, the temporary priority logic configuring the signal output priority controller to automatically select and activate one of the car side cameras to display the picture of the image captured by the camera on the screen upon a previous light signal being released and the non-generation of a subsequent light signal; the picture of the image being retained for a preset period of time.

9. The system as claimed in claim 8, wherein the car side cameras further includes at least one front side camera.

10. The system as claimed in claim 9, wherein the temporary priority logic of light signals is set as: the system is automatically switched to activate the front side camera or the left side camera to display the picture of the image captured by the front side camera or the left side camera on the screen first when the previous light signal is the reverse signal being released; the picture of the image is retained for a preset period of time.

11. The system as claimed in claim 1, wherein the system is further used in combination with an event data recorder (EDR); the EDR is connected to the video signal source switch processor of the car side video assist system by a port so as to record image data captured by the cameras of the car side video assist system.

12. The system as claimed in claim 11, wherein the EDR is further connected to an image input extension port arranged at the video signal source switch processor so that the image data recorded in the EDR is displayed on the screen of the display device of the car side video assist system.

13. The system as claimed in claim 1, wherein the system is used in combination with a global positioning system (GPS); the GPS is connected to an image input extension port arranged at the video signal source switch processor so that vehicle data of the GPS is displayed on the screen of the display device of the car side video assist system.

14. The system as claimed in claim 13, wherein the system is used together with an event data recorder (EDR); the vehicle data provided by the GPS and the image data captured by the cameras of the car side video assist system are recorded by the EDR; the image data recorded by the EDR is displayed by the display device of the car side video assist system.

15. The system as claimed in claim 14, wherein the image data recorded by the EDR includes vehicle data having date, time, global coordinate, and speed provided by the GPS.

* * * * *